(12) United States Patent
Kuznetsov et al.

(10) Patent No.: US 8,031,373 B2
(45) Date of Patent: Oct. 4, 2011

(54) METHOD FOR ADAPTIVELY SCREENING A CONTINUOUS TONE ORIGINAL AND DEVICE FOR CARRYING OUT SAID METHOD

(76) Inventors: Jury Veniaminovich Kuznetsov, Saint-Petersburg (RU); Andrei Aleksandrovich Shadenko, Saint-Petersburg (RU)

(*) Notice: Subject to any disclaimer, the term of this patent is extended or adjusted under 35 U.S.C. 154(b) by 864 days.

(21) Appl. No.: 11/922,849

(22) PCT Filed: Jun. 26, 2006

(86) PCT No.: PCT/RU2006/000332
§ 371 (c)(1),
(2), (4) Date: Dec. 26, 2007

(87) PCT Pub. No.: WO2007/018448
PCT Pub. Date: Feb. 15, 2007

(65) Prior Publication Data
US 2010/0060937 A1    Mar. 11, 2010

(30) Foreign Application Priority Data

Jun. 27, 2005 (RU) ................. 2005119882

(51) Int. Cl.
*H04N 1/405* (2006.01)
(52) U.S. Cl. .................. 358/3.06; 358/3.03
(58) Field of Classification Search ............ 358/1.9, 358/2.1, 3.03–3.06, 3.13–3.19, 3.21–3.22, 358/3.24; 382/237
See application file for complete search history.

(56) References Cited

U.S. PATENT DOCUMENTS

| 5,229,867 A | 7/1993 | Ershov et al. |
| 7,199,905 B2* | 4/2007 | Sharma ............. 358/3.04 |
| 2008/0170267 A1* | 7/2008 | Li et al. ............. 358/3.03 |

FOREIGN PATENT DOCUMENTS

| GB | 1 407 487 A | 9/1975 |
| JP | 56-055257 A | 5/1981 |
| RU | 2 126 598 C1 | 2/1999 |

* cited by examiner

*Primary Examiner* — Thomas D Lee
*Assistant Examiner* — Stephen M Brinich
(74) *Attorney, Agent, or Firm* — Birch, Stewart, Kolasch & Birch, LLP

(57) ABSTRACT

A method of converting two-dimension signal including multilevel tone values of areas of the original into two-dimension halftone print copy signal including two-level tone values of printed and blank elements thereof includes, forming two types of two-dimension weight values. In the first, these values are distributed among print copy elements in an order independent of the tone variation along areas of the original. In the second, the geometry of contours and fine details thereof are taken into account. The two-level halftone copy signal is formed by comparing signal values of areas of the original and weight values of the first and second types. The second type values are placed inside the space intervals-segments, whose position is determined by forming the counter trace signal, and the boundaries of segments are set according to the number of neighboring elements for reproducing the counter or fine detail on the halftone copy.

16 Claims, 12 Drawing Sheets

METHOD FOR ADAPTIVELY SCREENING A CONTINUOUS TONE ORIGINAL AND DEVICE FOR CARRYING OUT SAID METHOD

FIELD OF THE INVENTION

The invention relates to graphic arts, facsimile and publishing techniques and, more specifically, to the systems reproducing an image by two tone levels for an each of the process (triad) colors. The invention can be used in graphic outputs and digital presses, in computer systems for graphic data processing, in facsimile and copier equipment.

DESCRIPTION OF THE RELATED ART

The so called screening is used in graphic arts printing, electrophotography and thermography, in matrix and ink jet printing to imitate the grey levels of a continuous tone (CT) original image. It comprises the variation of relative area occupied on a copy by the printing elements creating the halftone dots, providing the first tone level, and by the non-printing elements, creating the blanks to provide the second tone level. The minimum sizes of steadily reproducible halftone dots and blanks have a finite value dependent on a noise level in a system, which level is, in turn, dependent on the properties of the substrate on which to reproduce the image, as well as on ink, plate and facilities of equipment. With due account taken of these restrictions, the spatial frequency of halftone dots placement defined as the screen ruling (lines per inch—lpi) should not be excessively high because their relative areas should be free to vary in sufficiently large margins to thereby assure the desired number of gradations that can be reproduced. At the same time, insufficient screen ruling will limit image definition and sharpness resulting in the loss of fine details and distortion of contours geometry.

To simultaneously satisfy the contradictory requirements of preserving both the definition and sufficient amount of tone levels of an original, a principle of adaptive screening is used, which selectively, with taking into account the specific of particular image area or the so called busyness thereof, changes its properties to meet on of said requirements to a greater or a lesser extent (Yu. V. Kuznetsov, V. A. Uzilevski. Electronic Screening in Graphic Arts. "Kniga", Moscow, 1976 (Russ.)). As in the number of optimal encoding solutions for transmitting or withdrawing redundancy of CT image data, the psycho-visual premise for an adaptive approach here lies in the well known relation between the contrast or sensitivity threshold of vision and the dimension of a detail or the upper spatial frequency of an image pattern.

There is known prior-art method for adaptive screening (SU 1634119, U.S. Pat. No. 5,229,867, GB 224910, DE 4037319) the CT original presented by the signal of optical parameter (tone value) of its areas in periodic structure of relatively low spatial frequency. In this method the substrate areas corresponding to the areas of the original and intended for reproduction of an image, are divided into elements which form a periodic structure of relatively high spatial frequency. Each element of a substrate is assigned one of the weight values from the number of tone values to provide the desired outlaw of tone rendition, the distribution of these weight values element-wise being identical within the margins of an each area. While forming halftone copy, the weight value of each element is compared with the tone signal value of the original area corresponding to the substrate area. Element is formed printed or non-printed as result comparison.

To improve the quality of a contour reproduction, this method provides the displacement of halftone dots comprised of printing elements on the areas intersected by contour. The dots are displaced towards the darker part of the image divided by the contour—increasingly so with increasing the contour contrast—by way of correcting the weight value addresses as indicated by analysis of ratio of tone values signal of the original area corresponding the substrate area to be formed and the adjacent original areas.

The device for adaptive screening of a CT original (U.S. Pat. No. 5,229,867) according to this method comprises the light source, a means for the beam from this light source to scan the elements of a substrate area, a light-source beam chopper, and a source of signals corresponding to tone values of an original areas. The source of signals has a main output, whose signal characterizes tone of the original area corresponding to the substrate area containing the element exposed to the light-source beam, and several supplementary outputs whose signals characterize the tone of the original areas adjoining the one, whose tone is characterized by the signal at the main output of the source of a signal.

The device also comprises the synchronizing means, a source of weight values for elements of substrate areas, an unit to form the coordinates for the substrate areas, a beam chopper control unit, and element-coordinate correction units connected in the way providing the halftone dots displacement on a copy according to this method.

Owing to the halftone dots displacement, the method and device according this patent assure better contours reproduction. Nevertheless, these contours are not free from the step-wise distortion as far as they are formed by the halftone dots of relatively low spatial periodicity. At the same time, the relatively high spatial frequency of substrate area elements might allow of better contour rendition, considering that in the types of methods under discussion it is an order of magnitude higher than that of areas. The unsatisfactory quality of contour reproduction in said method and device is associated with the halftone dot size being dependent on the averaged value of the tone signal of an area, for example, of the reflection coefficient thereof. It is for this reason that for an area of an original, having uniform grey tone, and for an area divided half dark and half light, the halftone dot size will be the same. The dot shape will like-wise be the same, because the distribution of weight values for the elements in all the areas will be identical, being selected to achieve smooth tone rendition within zones where the tone changes but slowly and where the sensitivity threshold of vision is particularly small. Therefore, the halftone dot or some part thereof, both composed of a multiplicity of elements, becomes the minimum spatial discrete unit to define the geometrical accuracy of reproduction of a contour or a fine detail, rather than an individual element, whose size ultimately determines the resolution of the output device or the printing process as a whole. This potential of printing process is better used to provide the higher quality of contour reproduction with preserving the tone rendition continuity, the volume of an image signal and the time of its processing in the method and device disclosed in patents RU 2126598; UK 2300328; U.S. Pat. No. 5,822,086; DE 4498946.

In one of the embodiments of this method for adaptive screening of a CT original represented by the signal of a tone value of its areas comprising the periodic structure of relatively low spatial frequency, the corresponding areas of a substrate are divided into elements of relatively high spatial frequency. Each of these elements is assigned one of first weight values to provide the desired law of tone rendition, i.e. independent on the local (within the area) tone variation on an original. The presence or absence of a contour is ascertained in the original area corresponding to a given substrate area. Where no contour is present in said original area, each element of given substrate area is formed as a printing element if its first weight value exceeds the tone signal value of said original area and as a non-printing element if its first weight value does not exceed the tone signal value of said original area. With a contour being present, said area is estimated for its relative busyness and each element of corresponding substrate area is assigned one of the second weight values, all selected so as to achieve geometric accuracy of contour reproduction. A first supplementary value $M_1=M+q(M_{max}-M)$ and a second supplementary value $M_2=M_{max}-q(M_{max}-M)$, where M is the tone signal value of given original area, q is the relative busyness, and $M_{max}$ is the maximum possible value of this signal, are determined for said original area. Each element of the given substrate area is formed as a printing element if its first weight value exceeds the first supplementary value $M_1$ and/or if its second weight value exceeds the second supplementary value $M_2$ and as a non-printing element if its first weight value does not exceed the first supplementary value $M_1$ and its second weight value does not exceed the second supplementary value $M_2$.

In this method the significance of second weight values, as far as the process of forming substrate elements as printing or non-printing is concerned, increases with increasing busyness of original area while the significance of first values decreases. And vice versa. The significance of specific weight values is accounted for through the use of the supplementary values $M_1$ and $M_2$ which are dependent upon the relative busyness value of an area. The greater the busyness of an original area, the greater number of elements that will be formed as printing or non-printing elements within the corresponding substrate area, based on the comparison of their second weight values with the $M_2$ value; the lesser the busyness level, the greater number of elements that will be formed as printing or non-printing elements, based on the comparison of their first weight values with the $M_1$ value. In this way both of the essential requirements for continuous tone original screening—smooth tone rendition and accurate contour geometry reproduction—are satisfied.

The device for adaptive screening (U.S. Pat. No. 5,822, 086) comprises an exposure-source, a means for the beam from this source to scan the elements of a substrate area, an exposure-source beam chopper, and a source of signals. The source of signals has a main output, whose signal characterizes tone of the original area corresponding to the substrate area containing the exposed element, and several supplementary outputs whose signals characterize the tone values of the original areas adjoining said original area. Therefore the signal, produced by this source, comprises the two-dimensionally spatially sampled signal. In this device the exposure control unit is connected by its output to a beam chopper and by its inputs to the main and supplementary outputs of a source of signals. This unit comprises the circuits to perform the processing of said signals, which is predetermined by the above described method. The device also comprises the source of first weight values, designed to ensure the desired smooth tone rendition in the original screening process, and the source of second weight values, designed to ensure the desired geometrical accuracy of contour reproduction.

However, these methods and devices do not completely use the printing process facilities to render fine details and contours even when the image is captured at the level of this process resolution, i.e. when the number and placement of printing elements coincides with the number and placement of areas of an original. One of reasons is comprised in that the regular pattern of substrate areas at predetermined spatial frequency defined by the screen ruling value is used to make a halftone of the original area containing a contour. The presence of the substrate areas regular pattern of relatively low spatial frequency does not permit the complete adaptation of weight values to arbitrary contour which results in partial loss of definition and sharpness at transition from the original to its halftone copy.

SUMMARY OF THE INVENTION

The goal of given invention is comprised in creating the method and device for adaptive screening a CT original which allow for increasing the definition and sharpness of a print due to the maximal use of printing resolution during the transformation of an input two-dimensional signal of tone of an original, this signal comprising the multilevel tone values of an original areas and presented in the matrix of areas, into a two-dimensional signal of a halftone copy, this signal comprising the two-level tone values of printing and non-printing elements and presented in the matrix of elements.

These weight values are distributed among the elements of the first weight value matrix in the order which does not depend on the specific of tone value variation i.e. proceeding from the principle of smooth rendition of tone of an original on a copy. Among the elements of second weight value matrix the values are distributed with taking into account a contour geometry. The two-level signal of a halftone copy is formed, its values being defined as result of comparison of the first or second weight value matrix with the matrix of areas of an original. Raised problem is solved by positioning the part of weight values of the second matrix, when forming signal of weight values distribution, within the spatial intervals—segments which are determined by forming the contour trace signal, as a matrix identical in its size to that of the weight value matrix, and by assigning the informative signal values to elements of this matrix corresponding to original areas containing a contour, these signals indicating the contour location, while assigning the other, non-informative values to the rest of matrix elements, and by defining the location of bounds of said segments in dependence on the amount of neighboring elements used for a contour reproduction on a halftone copy.

The two-level signal of a halftone copy may be formed with the use of the reduced volume of two-dimensional tone signal of an original with subjecting this signal to the low spatial frequency filtration.

The location of segments bounds may be defined by the number of the second weight value matrix elements placed between the elements, which correspond to elements of contour trace signal matrix having the informative values, and these bounds, this number being a constant, i.e. not varying over the given image, or being a variable which functionally depends on contour parameters, for example, on its sharpness.

In direction from second weight value matrix elements, corresponding to informative values of contour trace signal, to boundary of given segment the weight values may be distributed randomly, monotonously decreasing (increasing) or by simple repetition.

In direction matching the position of second weight value matrix elements, corresponding to informative values of contour trace signal, the weight values may be distributed randomly, a-periodically, with a constant periodicity or with an alternative periodicity dependant on contour parameters.

With the contour trace signal has been formed the two-dimensional signal of an image tone may be presented by the multilevel tone values of an image areas in conjunction with the contour trace signal.

The number of elements, comprising the matrix of tone values of image areas, may be decreased in relation to its initial amount to reduce the redundancy of an image data.

Fine detail and contour rendition accuracy is increased in given method with the complete use of a printing process resolution due to the arbitrary contour trace signal formation, which is not, as in the prior art, restricted by the step of a screen, as well as due to the two-dimensional weight values distribution with the use of this signal.

Comprising the combination of procedures with an image signal, this method can be assumed as a basis algorithm for its software implementations. Nevertheless, there is preferable, for example for higher productivity, to use in some applications the hardware method realization in the device for adaptive screening.

The proposed device for adaptive screening comprises a source of two-dimension spatially sampled tone signal of an original, this source being connected to the tone signal input of the two-level halftone copy signal former and to the input of a contour strength detector. The output of detector is communicated with the input of a distributor of the second weight values. Said distributor output is connected to the second weight values input of the former. The device also comprises the distributor of the first weight values, which output is connected to the first weight values input of the former. The device includes, as well, the contour trace two-dimensional signal generator with its input connected to the detector output and with its output connected to the input of a segments signal forming unit. The output of said unit is connected to the input of the second weight values distributor and to the segments signal input of the former.

The former of the two-level halftone copy signal comprises the modulator, whose first and second inputs are correspondingly formed by the segments signal and tone signal inputs of the former, the adder connected by its first input to the output of the modulator and with its second input formed by the second weight values input of the former, the comparator, whose first input is connected to the output of said adder, the second input is formed by the tone signal input of the former and the output is connected to the input of a signal normalizer, the output of the latter comprising the output of the former.

The contour trace two-dimensional signal generator contains the buffer, whose output is connected to the input of a comparator and to the input of an arithmetical mean determiner. Said determiner output is connected to the other input of comparator, whose output is connected to the input of the level normalizer of an output contour trace signal.

BRIEF DESCRIPTION OF THE DRAWINGS

The invention is hereinafter made more fully apparent through a detailed description of examples of its embodiment, with due references to the accompanying drawings.

DETAILED DESCRIPTION OF THE INVENTION

Method Description

According to this invention the method for adaptive screening a continuous tone original is comprised in that the latter is divided on areas (4) and each of them is assigned by one of the tone signal values of an original. The number and location of these areas correspond to that of the weight values matrix and of the matrix of the two-dimensional bi-level signal of the halftone copy of an original. In other words, the resolution of media, which comprises the original as the two-dimensional signal of its tone, is made equal to that of the media which reproduces the halftone copy. Such two-dimensional signal is three-dimensionally (3D) shown on FIG. 2. It can be analytically presented by the discrete function $E = f(k \times \Delta x, i \times \Delta y)$ of two spatial variables, where k and i are integers indicating the location of the given original area and $\Delta x$, $\Delta y$ are correspondingly the spatial sampling intervals for x and y coordinates, or by the complete matrix $[E_{i,k}]_{m,n}$ of this function. The two-dimensional signal (FIG. 2) corresponds to the original (character "Q" of an intermediate contrast) divided by m×n (m=n=50) areas (4), each of these areas having one of the signal values $E_{i,k}$ from their variety of 0÷255.

With the use of this signal, according to the method herein below described, there is formed the two-dimensional contour trace signal, which location is indicated by the line (1) on FIG. 1. Such signal allows for providing the halftone copy (FIG. 4) which in a greater degree matches the original than the halftone copy (FIG. 3) provided by the conventional method.

Figure 5:
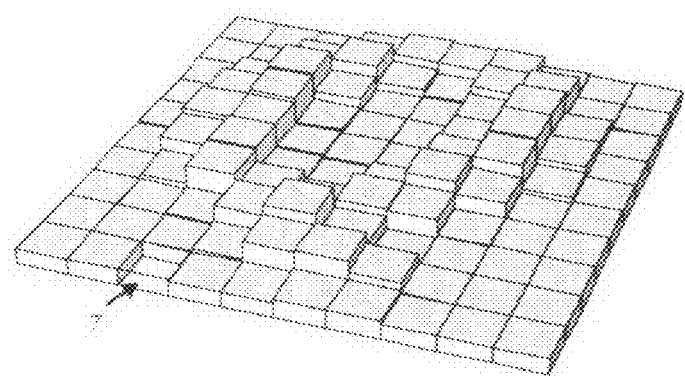
FIG. 5 shows the two-dimensional signal of a piece of continuous tone original (character "Q" of an intermediate contrast) containing m×n (m=n=50) areas (7), the values $E_{i,k}$ of this signal belonging to the variety of 0÷255 and the number and location of these areas not corresponding to the number and location of the elements in two-dimensional signal matrix of a halftone copy.

When the number and location of areas (7) presenting (FIG. 5) an original does not correspond to that of the elements in the halftone copy signal matrix, the areas of an original are re-sampled. The tone signal values of the new areas (8) are found by interpolation provided over the whole space of an original or for its part processed in the moment, in the case of successive in time processing. The wide known interpolation methods may be used to re-sample the original areas, for example, the two-dimensional polynomial one with polynom of the first order (bi-linear interpolation) or of the third order (bi-cubic interpolation), which result is illustrated by the two-dimensional signal on FIG. 6.

Figure 2:
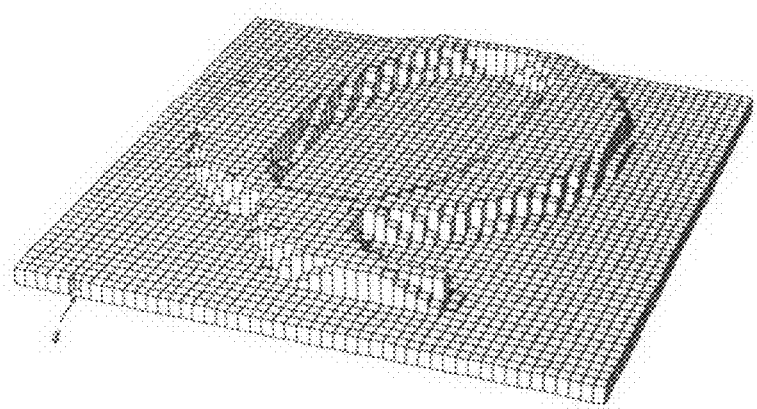
FIG. 2 shows the two-dimensional signal of a piece of continuous tone original (character "Q" of an intermediate contrast) containing m×n (m=n=50) areas (4), the values $E_{i,k}$ of this signal belonging to the variety of 0-255 and the number and location of these areas corresponding to the number and location of the elements in two-dimensional signal matrix of a halftone copy.
Figure 3:
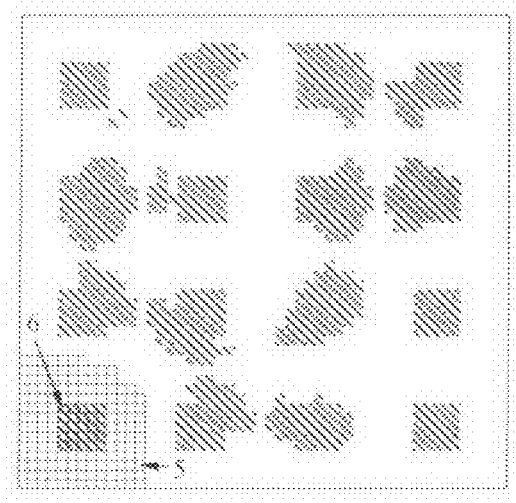
FIG. 3 illustrates the halftone copy of an original presented by two-dimensional signal of FIG. 2 and produced with the use of weight values distribution shown on FIG. 9.
Figure 4:
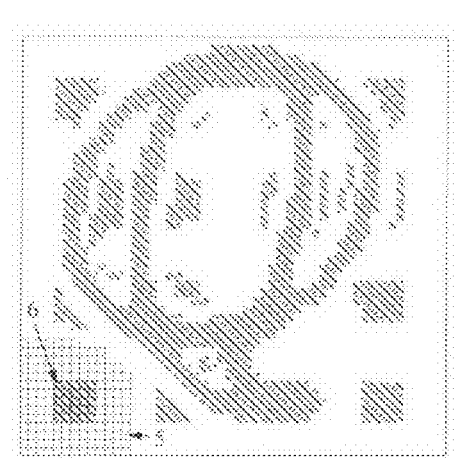
FIG. 4 illustrates the halftone copy of an original presented by two-dimensional signal of FIG. 2 and produced with the use of weight values distribution shown on FIG. 21.

The two-dimensional signal distributions of weight values (thresholds) are provided to form the copy elements printed or blank, these values belonging to the variety of multilevel tone signal levels of an original and presented by the matrix equal in size to the matrix of copy elements. The latter are formed printed (6) or blank (5) as result of the tone signal values matrix comparison with the matrix of thresholds. In the conventional halftoning methods and, for example, in the method disclosed in the above mentioned U.S. Pat. No. 5,229,867 the threshold signal is formed with distributing its values without taking into account the specific of the tone signal variation over original image but rather to provide on a copy, for example, the smooth tone rendition of the relatively stationary parts of an original. These values may be presented, for example, by the so called "screen hills" or "screen ridges" comprising the graphic halftone meshes positioned over the space of an image periodically at the frequency (screen ruling) L (lines per inch) as illustrated on FIG. 9 and FIG. 10. FIG. 3 and FIG. 11 illustrate correspondingly the halftone copies, which are produced by the comparison of said distribution matrixes with the signal matrix of the original tone values shown on FIG. 2.

Figure 12:
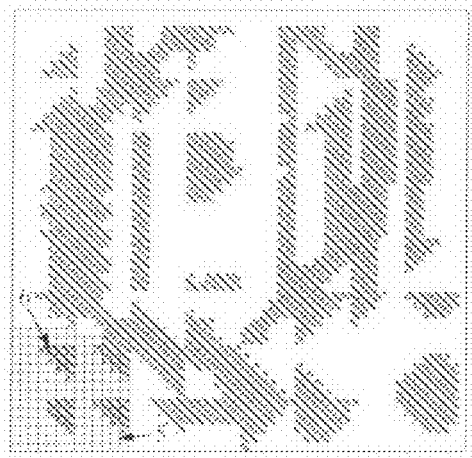
FIG. 12 illustrates the halftone copy produced with the use of two-dimensional signal of FIG. 5 of an original by the adaptive screening technique disclosed in the U.S. Pat. No. 5,822,086.

U.S. Pat. No. 5,822,086 teaches to distribute the weight values between the its matrix elements located in the screen meshes, which correspond to the original areas containing a contour, with taking into account the geometry of the latter to achieve the higher degree of the copy matching to original image. However, the relatively low spatial frequency of the screen does not allow for adaptation of the contour reproduction accuracy to the printer resolution as far as the latter is usually by the order of magnitude higher of a screen frequency. That's why the contour is reproduced relatively coarse, i.e., as FIG. 12 shows, by the segments (lines or bounds of a fixed orientation) defining the variants of the contour geometry at the length of these segments corresponding to the size of a screen mesh.

The herein disclosed invention provides the higher accuracy of thresholds distribution with due regard for contour geometry by the way of these thresholds placement within the arbitrary spatial intervals (segments), which are not related to the screen period. Said segments position is defined by forming the contour trace signal comprising the matrix, which is equal to the matrix of thresholds, and by assigning the informative (indicating the contour position) signal values to the part of this matrix elements and assigning the non-informative signal values to the rest of elements. The utmost levels of the signal quantization scale may be used as these informative and non-informative values, for example, the numerical values 255 and 0.

The principle of said assigning may based on the selection of the most representative elements having the non-zero values in the matrix of two-dimensional contour strength (busyness) signal, this signal produced by the way disclosed in the U.S. Pat. No. 5,822,086, or by the other known method using the spectral or impulse presentation of a signal. It can be, in particular, done by the double differentiation of tone values of original by its coordinates and limiting thereby produced second derivatives $E_{i,k}"$ by their absolute value and sign in relation to the level $E_0$ assumed as the contour presence criteria.

Figure 6:
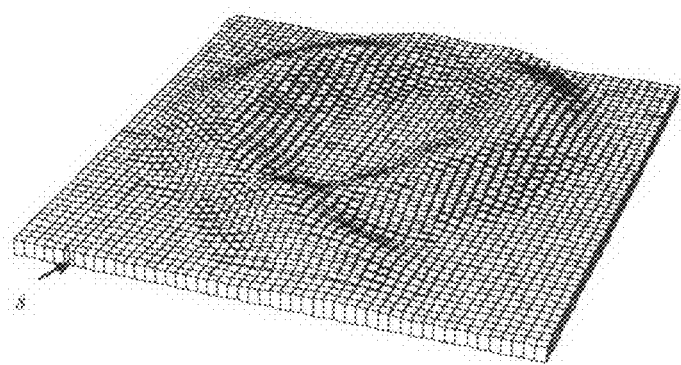
FIG. 6 illustrates the two-dimensional signal of tone value produced by re-sampling the signal values of original areas presented on FIG. 5.
Figure 7:
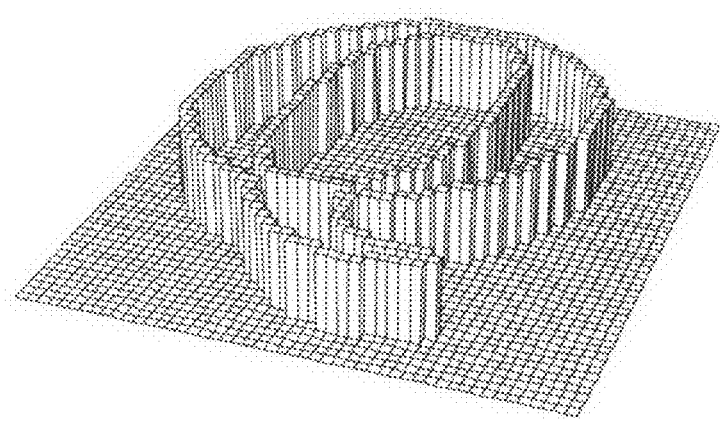
FIG. 7 illustrates the two-dimensional signal of trace of a contour produced from the input signal shown on FIG. 2.
Figure 8:
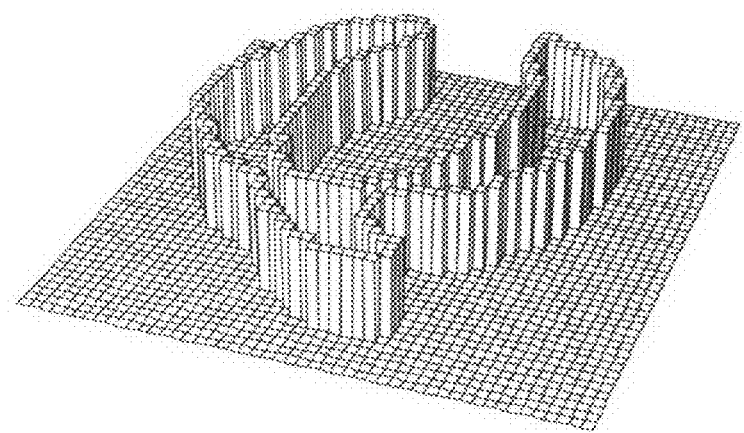
FIG. 8 illustrates the two-dimensional signal of trace of a contour produced from the input signal shown on FIG. 6.

The contour trace signal is formed for the whole image or for just the part thereof in the variant of consecutive image signal processing. FIG. 7 illustrates the two-dimensional contour trace signal produced from the input signal shown on FIG. 2. Same kind of a signal, shown on FIG. 8, is less representative in relation of the contour position on the original as far as produced with the use of a signal (FIG. 6), which was, in its turn, formed by the re-sampling original areas of FIG. 5 with their number being much fewer than that of the halftone copy elements.

The segment bounds position is set by the number of threshold matrix elements, which will be placed between the elements, which correspond to informative values of the contour trace signal, and these bounds. This number may be defined by the magnitude which may be constant for the whole given image. Nevertheless, it is purposeful to make said number functionally bound up with such contour parameters as its sharpness, contrast or/and distance from the neighboring contour to provide the seamless mutual blending of print element patterns formed with the use of the different types of weight values, such blending being inherent to our methods disclosed in U.S. Pat. No. 5,822,086 and SU 1246408.

Figure 1:
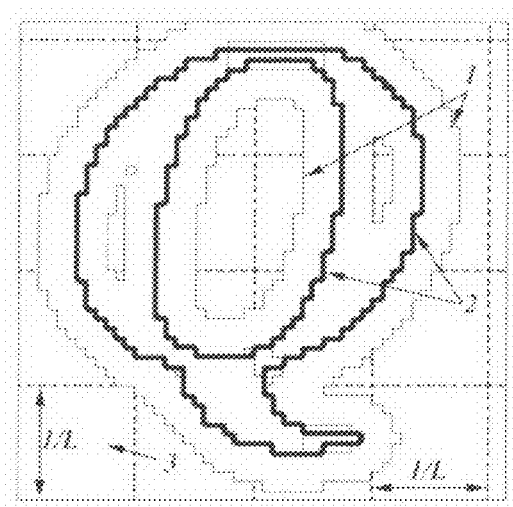
FIG. 1 illustrates the mutual placement of the bounds (1) of segments, the trace (2) of contour and the spatial periods (3) of weight values distribution non-related to contour geometry, i.e. the meshes of the orthogonal graphic halftone with the screen ruling of L lines per inch.

The variant of the segment bounds position, in relation to the location 2 (thick line) of the informative elements of a contour trace signal matrix, is shown on FIG. 1 by the thin line 1, while the dotted line 3 indicates here the bounds of spatial periods where the thresholds are distributed without taking into account the specific of tone variation on an original.

Figure 13:
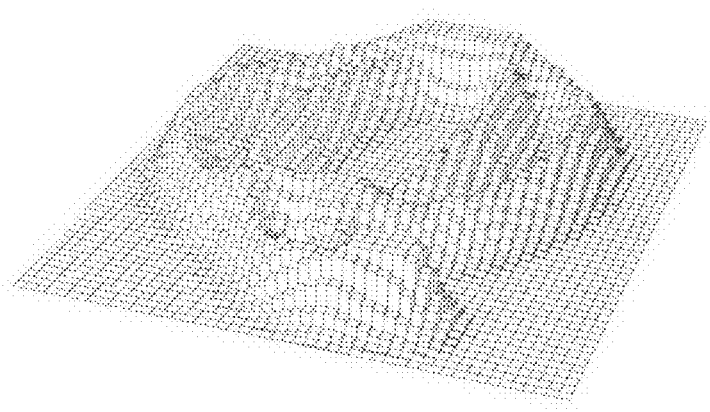
FIG. 13 illustrates the weight values distributed within the segments:
monotonously in direction to the nearest bounds of segments from the elements corresponding to informative values of contour trace signal shown on FIG. 7;
non-periodically in direction of the contour.
Figure 14:
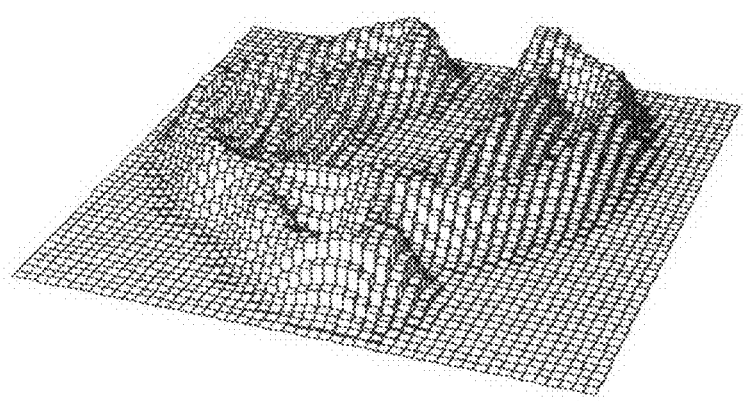
FIG. 14 illustrates the weight values distributed within the segments:
monotonously in direction to the nearest bounds of segments from the elements corresponding to informative values of contour trace signal shown on FIG. 8;
non-periodically in direction of the contour.
Figure 15:
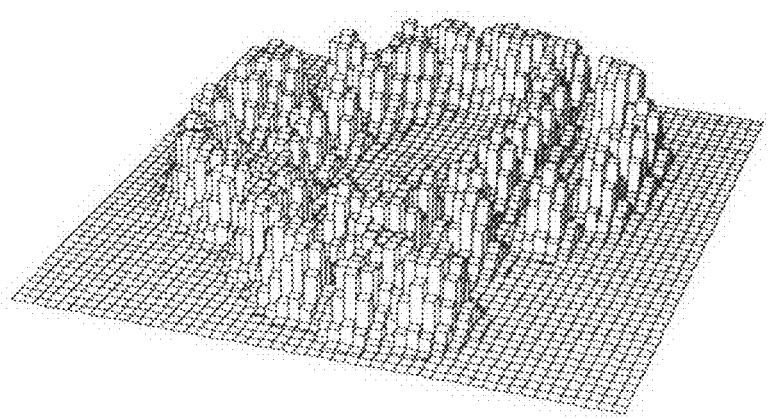
FIG. 15 illustrates the weight values distributed within the segments:
monotonously in direction to the nearest bounds of segments from the elements corresponding to informative values of contour trace signal shown on FIG. 7;
periodically in direction of the contour with periodicity not related to that of the screen.
Figure 16:
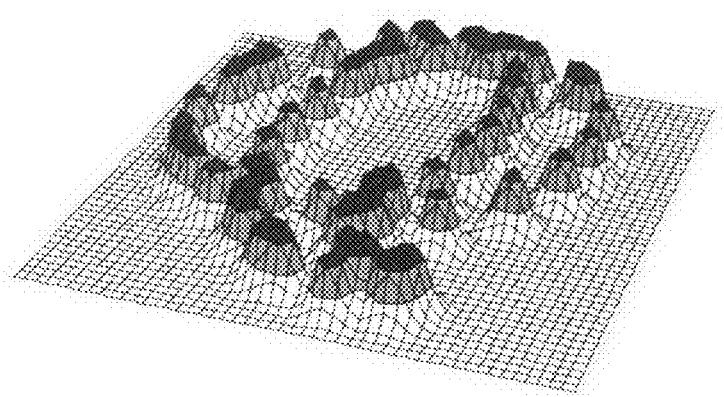
FIG. 16 shows the shape of the sampled signal on FIG. 15 to illustrate its periodicity along the contour.
Figure 17:
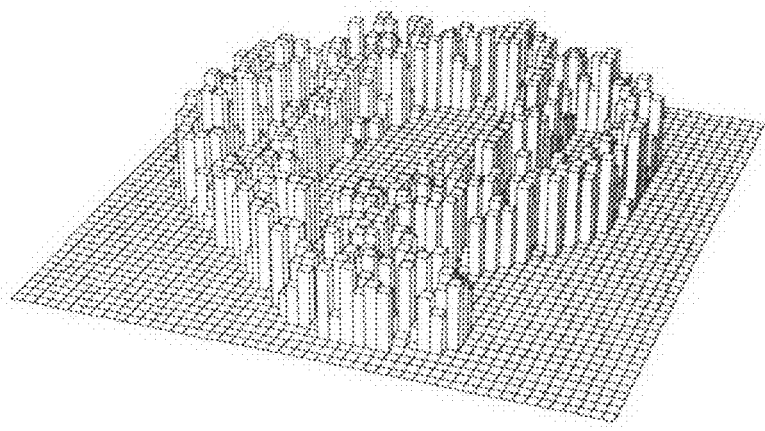
FIG. 17 illustrates the random placement of weight values within the segments.

Threshold values may be diversely distributed among the matrix elements within segments to faithfully reproduce the fine detail incorporating a contour. FIG. 13, FIG. 14 and FIG. 15 illustrate the examples of the thresholds monotonous distribution in direction to the nearest bounds of segments from the elements corresponding to informative values of contour trace signal. The distributions of FIG. 13 and FIG. 15 are produced with the use of contour trace signal as shown on FIG. 7, while the distribution of FIG. 14 corresponds to such signal of FIG. 8. At the same time, in examples, shown on FIG. 13 and FIG. 14, the weight values are distributed non-periodically in direction of a contour, while on FIG. 15 they are distributed in said direction periodically, their arbitrary periodicity not depending on the screen ruling. FIG. 16 illustrates the same as on FIG. 15 distribution but in the form of the shape of sampled signal to illustrate its periodicity along the contour. FIG. 17 illustrates the example of random distribution of thresholds within the segment, which is formed with the use of the contour trace signal of FIG. 7.

Figure 9:
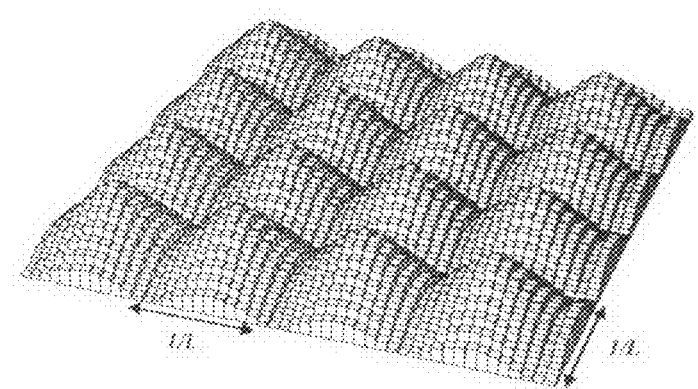
FIG. 9 shows the two-dimensional signal of weight values distribution which is not related to the variation of tone signal of an original and comprises the orthogonal periodic pattern with spatial frequency L (the screen ruling of graphic halftone screen).
Figure 10:
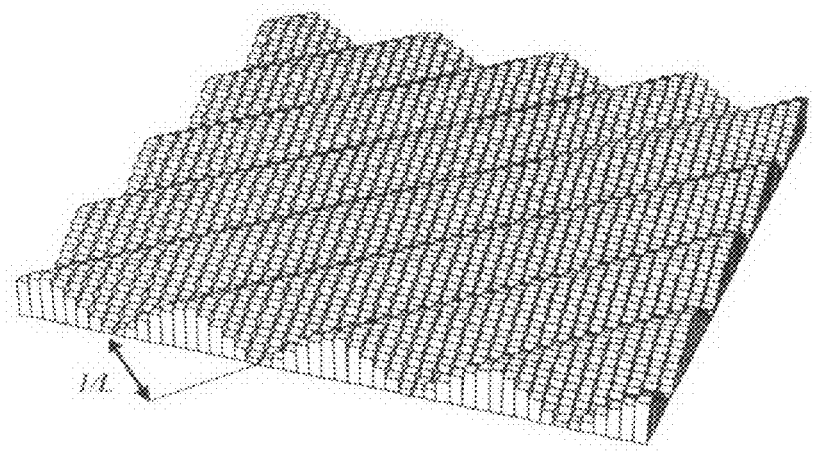
FIG. 10 shows the two-dimensional signal of weight values distribution which is not related to the variation of tone signal of an original and comprises the line-wise periodic pattern with spatial frequency L (the screen ruling of graphic halftone screen).
Figure 11:
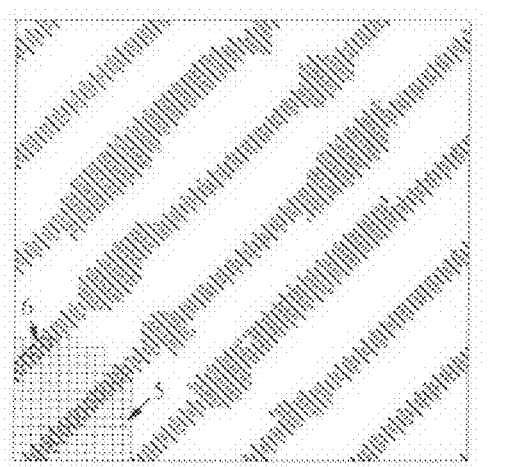
FIG. 11 illustrates the halftone copy produced with the use of two-dimensional signal of FIG. 2 of an original and of weight values distribution of FIG. 10.

The weight values are distributed among the first threshold matrix elements independent on the tone signal variation over the original, as shown on FIG. 9 and FIG. 10.

Figure 29:
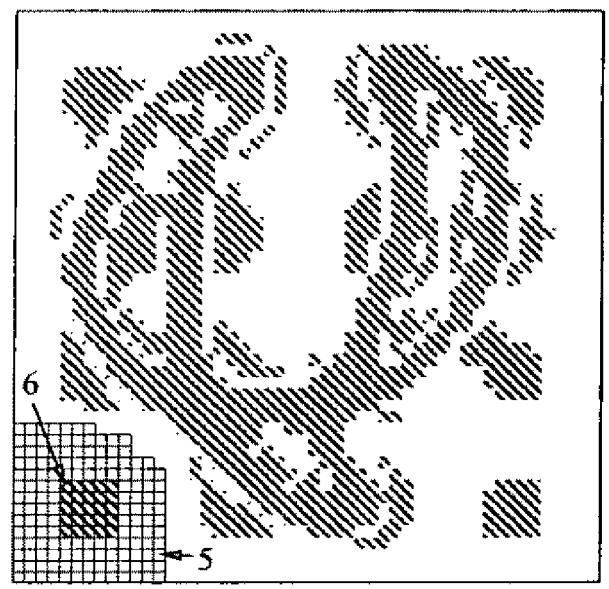
FIG. 29 illustrates the halftone copy produced with the use of interpolated two-dimensional signal of FIG. 6 of an original and of weight values distribution of FIG. 22.

Tone values of the two-dimensional multi-level input signal (FIG. 2) belonging to its matrix elements, which are located outside the segment, are compared with the first matrix (FIG. 9 or FIG. 10) of weight values, while tone values of the elements corresponding to the segments are compared with the second matrix (FIG. 13, FIG. 15 or FIG. 17) of weight values, to form the bi-level signal comprising the printing and blank elements, which are used to create on a substrate the halftone copy (FIG. 4, FIGS. 26-28) of an original image. The same kind of procedures may be used to form the halftone copy signal (FIG. 29) from the interpolated input data, as shown on FIG. 6, by comparing it with one of the first threshold matrixes (FIG. 9 or FIG. 10) and with the second threshold matrix (FIG. 14), the latter being also provided with use of this interpolated data by means of creating the contour trace signal illustrated by FIG. 8.

All these halftone copies (FIG. 4, FIGS. 26-29) faithfully reproduce the average tone of an original background by the corresponding sizes of the halftone dots, i.e. as it is done in conventional screening (FIG. 3 or FIG. 11). However, due to the herein above disclosed novel method the process resolution for an image fine detail (character Q in giving example) is not defined by the screen ruling (periodicity of halftone dots placement) but by the much higher resolution of a printer. This allows for increasing the faithfulness of fine detail reproduction as compared to an image on FIG. 12 provided by the method disclosed in the U.S. Pat. No. 5,822,086, which suggests the distribution of weight values in contour vicinity with the spatial frequency much fewer of that of a halftone copy elements.

Image Data Compressing Facilities

Figure 30:
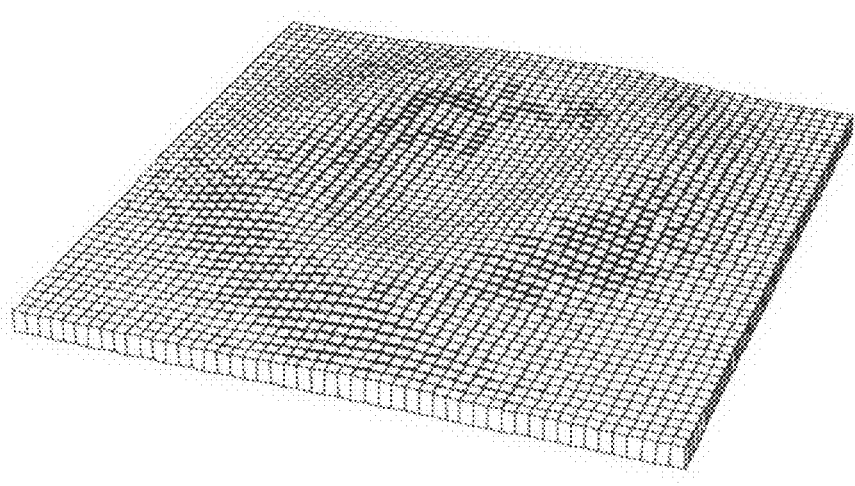
FIG. 30 illustrates the two-dimensional signal produced by the low pass filtration of the two-dimensional signal shown on FIG. 2.
Figure 31:
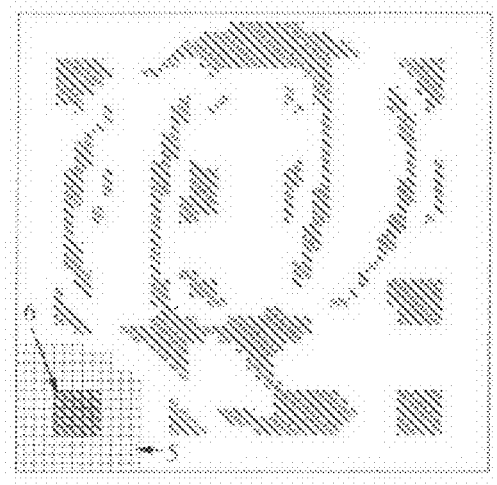
FIG. 31 illustrates the halftone copy produced with the use of two-dimensional signal of FIG. 30 restricted by its spatial frequency and of weight values distribution of FIG. 21.

Due to our method the image data, comprised by the high frequency components of original signal spatial spectra, is enclosed in the two-dimensional contour trace signal and is further transformed in the corresponding thresholds distribution without the use of the rest of these input data. That is why the input signal can be subjected to the low pass spatial filtration after the contour trace signal formation. This allows for the more compact presentation when storing, transmitting or processing said signal at the pre-press stages preceding the screening. The rate of such an input image data compression may be defined up to the data volumes applied in traditional screening, where the original data, averaged for the whole screen mesh or for just the quarter thereof (at the, so called, screening factor of 2), is used. FIG. 30 illustrates the result of low pass filtration (smoothing by arithmetical mean) of two-dimensional signal shown on FIG. 2. FIG. 31 shows the halftone copy signal formed as result of comparing the filtered signal of FIG. 30 with the first (FIG. 9) and the second (FIG. 13) threshold matrixes. This example vividly shows that, even in the case of the compressed data, our method preserves the higher faithfulness of reproduction than the conventional one (FIG. 3) or the method according to U.S. Pat. No. 5,822,086 (FIG. 12).

For the same purposes of compact presentation, the bi-level contour trace signal (FIG. 7 or FIG. 8) may be subjected to the effective intermediate encoding which, for example, uses the means of the, so called, vector graphics. With the contour trace signal has formed by the above described method, the original can be presented in the novel format comprising said signal side by side with the compressed input one and the counter strength data. Such presentation allows for the step-wise halftone copy formation. A first step may comprise the contour trace signal generation along with the other pre-press procedures (tone and color correction, un-sharp masking, etc.). A second step may comprise the second thresholds matrix formation and generating the bi-level signal for the whole halftone copy in a Raster Image Processor (RIP) capable to interpret such a format according to this invention. When RIP is not able to interpret this format, the bi-level values for copy elements corresponding to segments can be obtained separately with the use of the second thresholds matrix while, for the copy elements corresponding to the image background, i.e. to its parts not comprising a contour, the RIP will form such values with the use of its own matrixes.

The novel image file format allows for substantial reduction of a signal volume for its transmitting or intermediate storage. For example, the original signal captured in an input scanning device at 1000 dpi can be compressed, after the contour trace signal formation, by 100 times, i.e. to some equivalent volume of a signal scanned at 100 dpi. With the use of a signal of such compressed volume our method makes possible to produce the halftone copy at screen ruling of a 100 Lpi with better quality, than in conventional methods, and without losses.

Device Description

Figure 32:
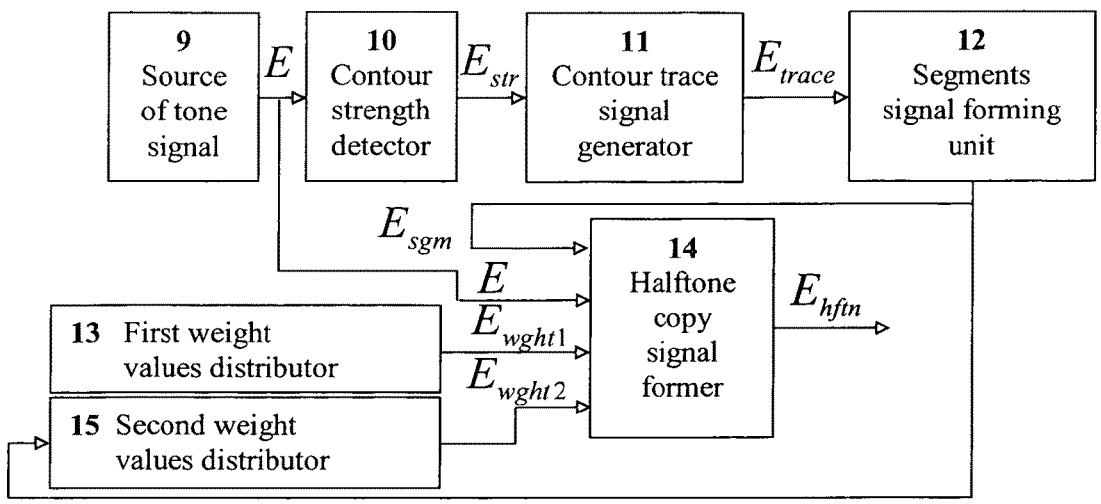
FIG. 32 is a block diagram of the device for adaptive image screening, according to the invention.

The proposed device (FIG. 32) for adaptive screening comprises a source 9 of two-dimension spatially sampled signal $E=f(k \times \Delta x, i \times \Delta y)$ presented by the matrix of its values $[E_{i,k}]_{m,n}$, this source being connected to the input E of a former 14 of the two-level halftone copy signal and to the input of a contour strength detector 10. The source 9 and the buffers 21, 25, used in the herein below described device, may be designed with the use of a fixing media capable to store the two-dimensional signal corresponding to the complete matrix of m×n elements, where m×n is the number of areas of an original, this number being equal to that of the elements in the matrix of a halftone copy two-dimension signal. Such media may be comprised of the Random Access Memory with each of its addresses indicating the certain element of the corresponding matrix of two-dimensional signal.

Figure 35:
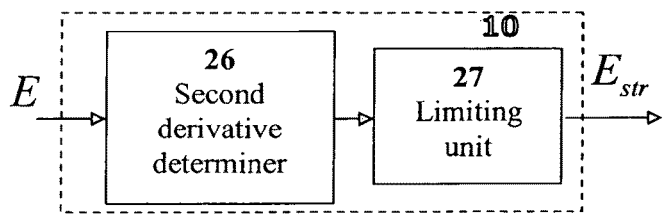
FIG. 35 is an embodiment of the contour strength detector in the device as shown in FIG. 32.

The detector 10 (FIG. 35) is designed to perform the double differentiation of an input signal and the limiting thereby produced second derivative by its absolute value and polarity. It contains a second derivative determiner 26 with its input forming the input of detector 10 and with its output connected to the input of a second derivative limiting unit 27. The output of the latter comprises the output of detector 10 communicated with the input of a values distributor 15 of the second weight values matrix. Said distributor output is connected to the input $E_{wght\ 2}$ of the former 14 of the two-level halftone copy signal.

The device also comprises a distributor 13 of the first weight values matrix designed to produce the non-periodic or periodic two-dimensional signal. Such a signal with its spatial period defined by the screen ruling value is, for example, illustrated on FIG. 9 or FIG. 10. Said distributor output is connected to the input $E_{wght\ 1}$ of the former 14. The device includes, as well, a contour trace two-dimensional signal generator 11 with its input $E_{strnth}$ connected to the detector 10 output and with its output connected to the input $E_{trace}$ of a segments signal forming unit 12. The output of said unit is connected to the input of a distributor 15 and to the input $E_{sgm\ i,k}$ of the former 14.

Figure 33:
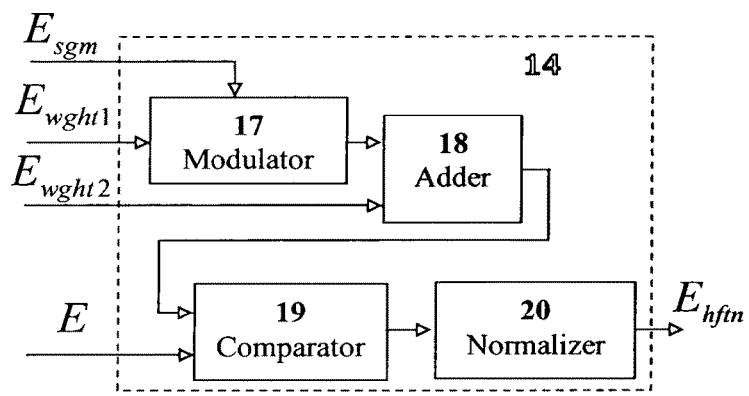
FIG. 33 is an embodiment of the former of the two-level halftone copy signal in the device as shown in FIG. 32.

The former 14 (FIG. 33) of the two-level halftone copy signal comprises a modulator 17, whose first input is supplied by the modulating signal from the input $E_{sgm}$ of the former 14 and whose second input is supplied by the signal, which is to be modulated, from the input $E_{wght\ 1}$ of the former 14, an adder 18 connected by its first input to the output of the modulator 17 and with its second input supplied by the signal from the input $E_{wght\ 2}$ of the former 14, a comparator 19, whose first input is connected to the output of adder 18, the second input is supplied by the signal from the input E of the former 14 and the output is connected to the input of a signal normalizer 20, the output of the latter comprising the output $E_{hftn}$ of the former.

Figure 34:
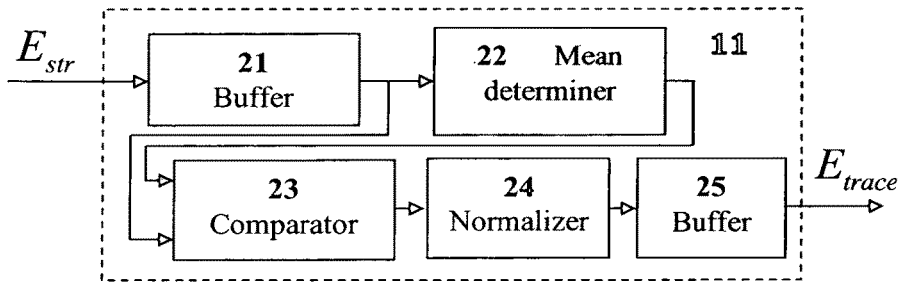
FIG. 34 is an embodiment of the contour trace signal generator in the device as shown in FIG. 32.

The contour trace two-dimensional signal generator 11 (FIG. 34) contains a buffer 21, whose input forms the input $E_{strnth}$ of said generator and is supplied by the two-dimensional contour strength signal values of said second derivative restricted by its absolute value and polarity. The output of buffer 21 is connected to the input of a comparator 23 and to the input of an arithmetical mean determiner 22 of said restricted values within a spatial interval assumed, for example, as the interval of 3×3 elements of the contour strength signal values matrix, the output of determiner 22 being connected to the other input of comparator 23. The output of the latter is connected to the input of a signal level normalizer 24, whose output is connected to a contour trace two-dimensional signal buffer 25 making by its output the output $E_{trace\ i,k}$ of the generator 11.

Device Operation

The proposed device operates as follows.

Signal $E=f(k \times \Delta x, i \times \Delta y)$ is supplied from the output of source 9, where it is presented by the complete matrix of its values $[E_{i,k}]_{m,n}$, to the input E of the former 14 and to the input of the countour strength detector 10. Determiner 26 of detector 10 calculates the second derivative value $E_{i,k}''$ by spatial variables x, y at their finite increments Δx, Δy according to the equation $$E_{i,k}'' = E_{i+1,k} + E_{i-1,k} + E_{i,k+1} + E_{i,k-1} - 4E_{i,k}$$

for each original area presented by the corresponding value of an input signal. The signal of second derivative value $E_{i,k}''$ arrives from the output of determiner 26 at the input of limiting unit 27 where it is limited according to the condition $E_{ltd\ i,k}'' = E_{i,k}''$ if $E_{i,k}'' \geq E_0$ and $E_{ltd\ i,k}'' = 0$ if $E_{i,k}'' < E_0$, the level $E_0$ being assumed as a sign of contour presence. Contour strength signal may be also calculated in detector 10 by the various known methods and, for example, by the way described in our U.S. Pat. No. 5,822,086 or by the other methods which use the spectral or sampled image signal presentation.

Signal $E_{ltd\ i,k}''$ of limited level then arrives at the input of buffer 21 in the contour trace signal generator 11 (FIG. 34), where this signal comprises its complete matrix $[E_{ltd\ i,k}'']_{m,n}$. Then the generator 11 performs the excerption of contour strength signal values, which are the most representative in relation of the contour spatial location. With this purpose the arithmetical mean determiner 22 calculates the arithmetical mean of an each i, k element $E_{ltd\ i,k}''$ value and that of adjoining this element, for example, neighboring nine elements $E_{ltd\ i,k}''$, $E_{ltd\ i+1,k}''$, $E_{ltd\ i,k+1}''$, $E_{ltd\ i-1,k}''$, $E_{ltd\ i,k-1}''$, $E_{ltd\ i-1,k-1}''$, $E_{ltd\ i-1,k+1}''$, $E_{ltd\ i+1,k-1}''$, $E_{ltd\ i+1,k+1}''$ of the complete matrix according to the equation $$E_{avrg_{i,k}}'' = \frac{\sum_{i-1}^{i+1}\sum_{k-1}^{k+1} E_{ltd_{i,k}}''}{9}.$$

The signal $E_{avrg\ i,k}''$ then arrives at the input of comparator 23, whose second input is supplied by the signal $E_{ltd\ i,k}''$ from buffer 21. The comparator 23 forms at its output the logical "1" ("True") if $E_{i,k}'' \geq E_{avrg\ i,k}''$ or the logical "0" (False"), if $E_{i,k}'' < E_{avrg\ i,k}''$.

Comparison of the given and weighted, as arithmetical mean of surround, contour strength values allows for determining the most representative ones whose location within a matrix indicates the spatial position of a contour with the greatest reliability.

The signal of logic variable "1" or "0" arrives from the output of comparator 23 at the input of the signal normalizer 24. Logic value "1" sets at the output of normalizer 24 the informative meaning of a contour trace signal $E_{trace\ i,k}$, which may be, for example, equal to the maximal value, which limits the range of possible tone signal $E=f(k \times \Delta x, i \times \Delta y)$ values. Logic value "0" sets at the output of normalizer 24 the non-informative meaning of a contour trace signal $E_{trace\ i,k}$ which is equal to the minimal, for example, null value of possible tone signal $E=f(k \times \Delta x, i \times \Delta y)$ values. Contour trace signal values, reduced to the range of a tone signal of original, arrive from the output of normalizer 24 at the input of the buffer 25 to be stored in the form of complete matrix $[E_{trace\ i,k}]_{m,n}$. The examples of such two-dimension signals produced from the input ones of FIG. 2 and FIG. 6 are correspondingly shown on FIG. 7 and FIG. 8.

The contour trace signal may be, as well, produced by the other methods using the spectral or sampled signal presentation. Moreover, the raster form of this signal presentation may be replaced by the vector one providing its lossless transformation.

The contour trace signal carries the most of the high frequency image content. That is why, after such signal formation, the overall image data may be compactly presented in an intermediate format combining the greatly down sampled input signal of tone of an original and the said trace signal also compressed with the use of one of the well known line work encoding techniques. Such compact presentation allows for the effective image signal exchange, transmission, storage and processing at the pre-press stage. Decompression of such signal may be provided at the final pre-press stage in the, so called, Raster Image Processor (RIP). This signal further interpretation and formation of a halftone copy signal according to the proposed method may be also performed outside from or in a RIP, if it incorporates the components of the proposed device, which operate as hereinafter described.

Figure 18:
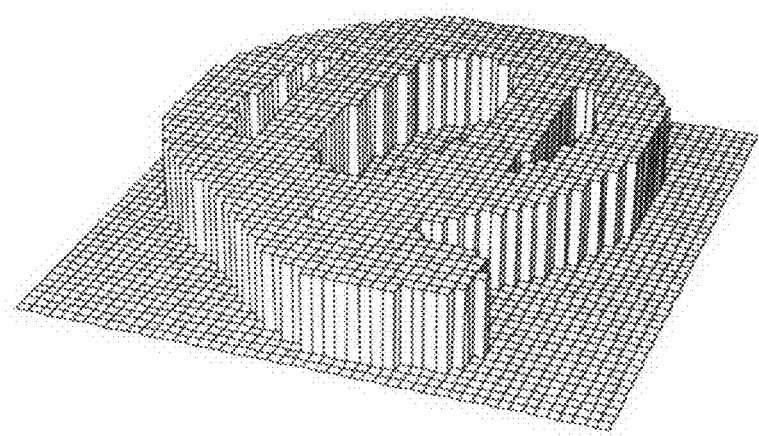
FIG. 18 illustrates the two-dimensional signal of segments produced by the spatial expanding of the contour trace signal shown on FIG. 7.

Two-dimensional contour trace signal, presented by the complete matrix $[E_{trace\ i,k}]_{m,n}$ of values or by just its part sufficient for the further calculation, arrives from the output of generator 11 (FIG. 32) at the input of the segments signal forming unit 12. The segments signal is formed by expanding the two-dimensional contour trace signal (FIG. 7) along the spatial variables x, y to the segment bounds. New values are set, for example, linearly or by the simple repetition of values resulting in formation of the signal (FIG. 18) of segments having value $E_{sgm\ i,k}$ which is equal to contour trace signal informative meaning, if the i-th, k-th element of the signal matrix $[E_{sgm\ i,k}]_{i,k}$ belongs to the segment, and is equal to contour trace signal non-informative meaning, if said element of the signal matrix does not belong to the segment.

Signal of segments arrives from the output of the unit 12 at the input $E_{sgm}$ of the former 14 of two-level halftone copy signal and at the input of the values distributor 15 of the second weight values matrix $[E_{wght\ 2\ i,k}]_{m,n}$. Such distributor may use, for example, the LUT of weight values and the selection of these values from LUT with taking into account the position of weight matrix element in relation to the informative elements of the contour trace signal matrix within the segment bounds. There may be also used the other principles based, for example, on a certain dispersion within said bounds the contour trace image with the use of a spatial filter. The same and, for example, null values are assigned to the second weight matrix $[E_{wght\ 2\ i,k}]_{m,n}$ elements outside the segment.

In direction from the second weight matrix elements, corresponding to informative contour trace matrix elements, to weight matrix elements, located at the nearest segment bounds, the second weight values are distributed, according to this invention, in an order of these values monotonous decreasing (increasing), in a random fashion or by a simple repetition. In direction parallel to location of weight matrix elements, corresponding to informative contour trace matrix elements, the second weight values are distributed periodically with a constant or varying periodicity, non-periodically, in a random fashion or by a simple repetition. The order of weight values distribution within the segments of the weight values matrix may be the same for all the segments or comprised by the finite number of distribution orders, the selection of particular one being provided with taking into account the contour parameters. FIG. 13-FIG. 17 illustrate the examples of two-dimensional signals of such distributions.

From distributor 15 output the weight values arrive at the input $E_{wght\ 2}$ of the former 14 of bi-level halftone copy signal.

The first weight matrix distributor 13 is designed to produce the weight values which are independent on tone signal variation over the original. This distributor forms, for example, the periodic signal of screen ruling frequency comprising the matrix $[E_{wght\ 1\ i,k}]_{m,n}$ of weight values arriving at the input $E_{wght\ 1}$ of the former 14. Such signal may be produced by repetition of one spatial period presented by the table of its values. FIG. 9 and FIG. 10 illustrate the examples of two-dimensional periodic signals of such distributions corresponding to two types of halftone screens.

Figure 19:
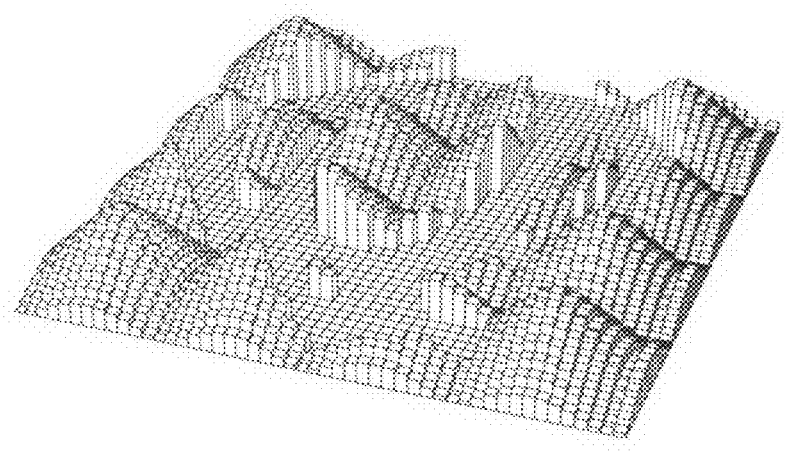
FIG. 19 illustrates the two-dimensional signal formed as result of modulation the periodic signal of FIG. 9 by the two-dimensional signal of FIG. 18.
Figure 20:
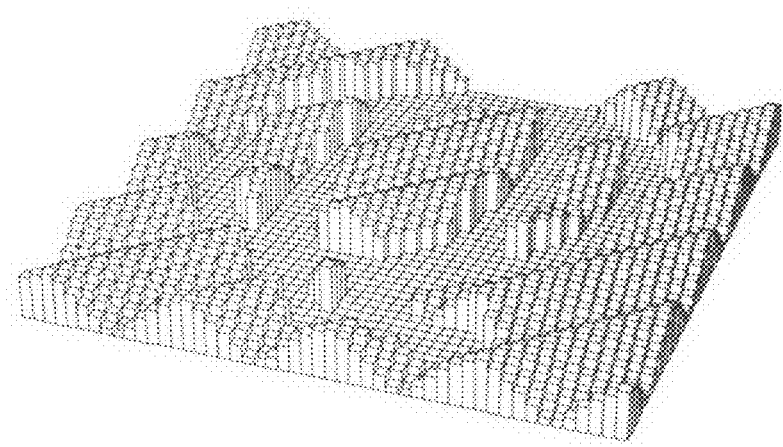
FIG. 20 illustrates the two-dimensional signal formed as result of modulation the periodic signal of FIG. 9 by the two-dimensional signal of FIG. 18.
Figure 21:
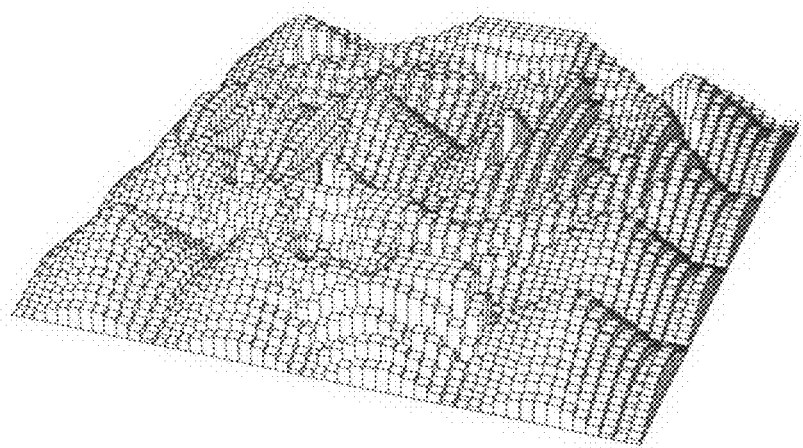
FIG. 21 illustrates the two-dimensional signal of weight values distribution produced by combining the signals of FIG. 13 and FIG. 19.
Figure 22:
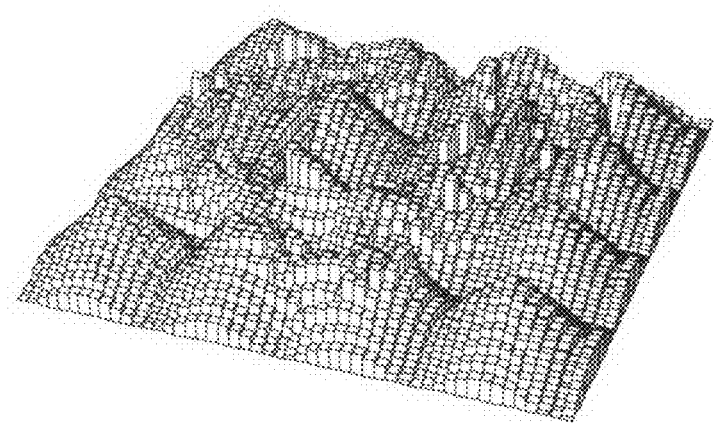
FIG. 22 illustrates the two-dimensional signal of weight values distribution produced by combining the signals of FIG. 14 and FIG. 19.
Figure 23:
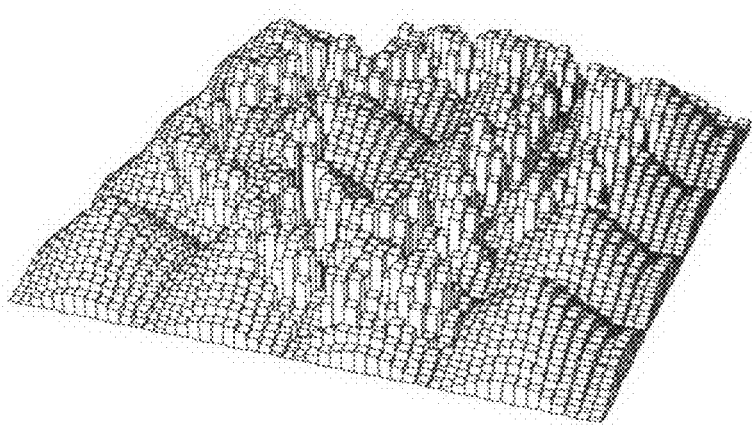
FIG. 23 illustrates the two-dimensional signal of weight values distribution produced by combining the signals of FIG. 15 (16) and FIG. 19.
Figure 24:
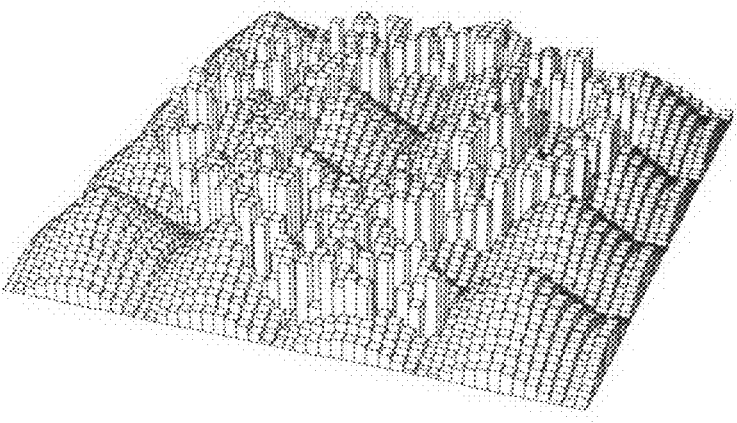
FIG. 24 illustrates the two-dimensional signal of weight values distribution produced by combining the signals of FIG. 17 and FIG. 19.
Figure 25:
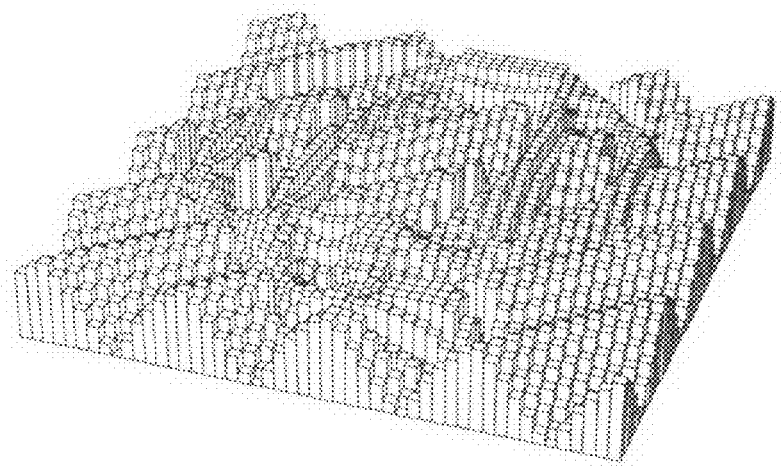
FIG. 25 illustrates the two-dimensional signal of weight values distribution produced by combining the signals of FIG. 13 and FIG. 20.
Figure 26:
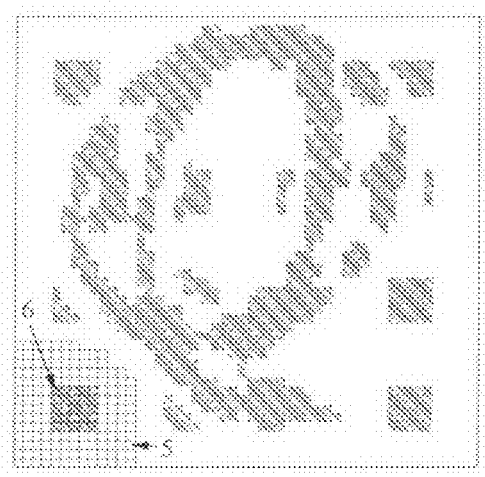
FIG. 26 illustrates the halftone copy produced with the use of two-dimensional signal of FIG. 2 of an original and of weight values distribution of FIG. 23.
Figure 27:
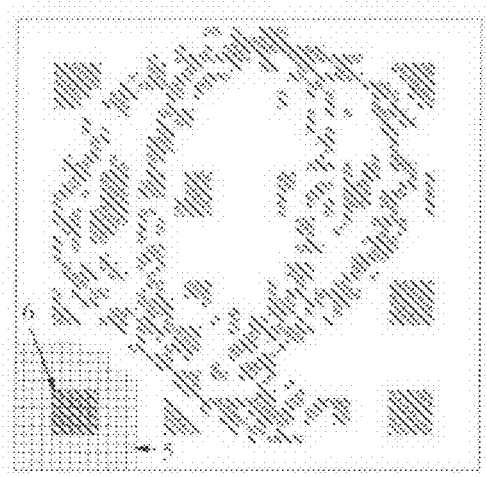
FIG. 27 illustrates the halftone copy produced with the use of two-dimensional signal of FIG. 2 of an original and of weight values distribution of FIG. 24.
Figure 28:
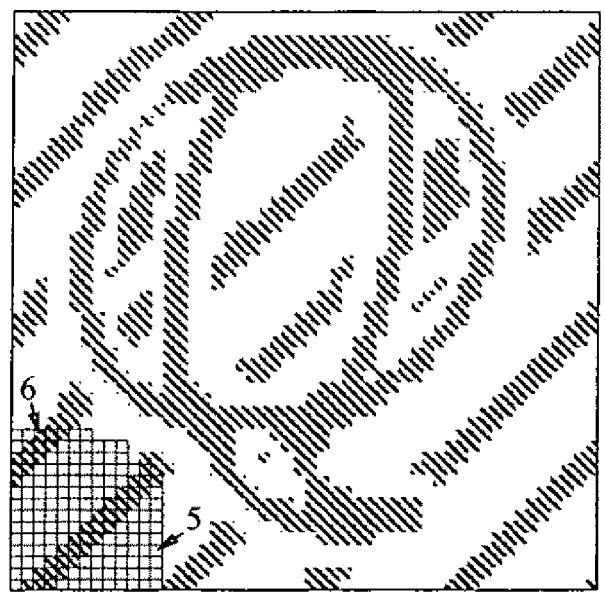
FIG. 28 illustrates the halftone copy produced with the use of two-dimensional signal of FIG. 2 of an original and of weight values distribution of FIG. 25.

The two-dimensional periodic signal, arriving from the distributor 13 (FIG. 32), is modulated in the former 14 by the two-dimensional signal of segments produced in the segments forming unit 12. The signal values $E_{wght\ 1}$ are modified in modulator 17 (FIG. 33) by signal $E_{sgm\ i,k}$ in the predetermined order and, for example, in such a way as to produce at modulator 17 output the signal having null values, when value of segment signal $E_{sgm\ i,k}$ is equal to the informative value of the contour trace signal, and having the value of the input signal $E_{wght\ 1}$, when modulating signal $E_{sgm\ i,k}$ corresponds to the non-informative value the contour trace signal. FIG. 19 and FIG. 20 illustrate the examples of two-dimensional signals produced as result of such modulation.

The adder 18 (FIG. 33) sums up the two-dimensional signals of the first and second weight value matrixes: $[E_{wght\ 1\ i,k}]_{m,n}$ and $[E_{wght\ 2\ i,k}]_{m,n}$. The summation of a pair, dimensionally equal matrixes results in producing the two-dimensional weight values signal $E_{sum\ i,k}$ presented by the summary matrix $[E_{sum\ i,k}]_{m,n}$, the elements of the latter having values of the first $[E_{wght\ 1\ i,k}]_{m,n}$ or of the second $[E_{wght\ 2\ i,k}]_{m,n}$ matrix depending on the spatial position of a matrix element. The examples of such summarized signals are illustrated on FIG. 21-FIG. 25.

Comparator 19 (FIG. 33) compares two-dimensional signals $E_{sum\ i,k}$ and $E_{i,k}$ by comparison of dimensionally equal matrixes $[E_{i,k}]_{m,n}$ and $[E_{sum\ i,k}]_{m,n}$. The output signal of the comparator 19 have the value of logical variable "1" ("True"), if $E_{sum\ i,k} > E_{i,k}$, and value "0" ("False"), if $E_{sum\ i,k} \leq E_{i,k}$. The signal having values "1" or "0" arrives from the comparator 19 output at normalizer 20 input. Value "1" sets the bi-level signal $E_{hftn\ i,k}$ value corresponding to the printed element of a halftone copy and value "0" sets this signal value corresponding to the blank element of a copy. Bi-level halftone copy signal $E_{hftn\ i,k}$ may arrive from the normalizer 20 output at the input of a buffer where it is stored as a complete matrix of this signal values or just for a part of this matrix elements sufficient to drive the device, which outputs the halftone image onto the material carrier.

ADVANTAGES AND INDUSTRIAL APPLICABILITIES

Incorporating, by the way described above, the contour trace two-dimensional signal generator (11) and the segments signal forming unit (12), this device realizes the new combination of procedures with an image signal which are specified by the proposed method. It allows for the novel design of the halftone processor providing the substantially higher quality level of printed copies of the continuous tone originals in real time of films or plates imaging or digital printers operation.

As result, the proposed device generates the two-dimensional bi-level signal providing the halftone image, where fine details of an original are reproduced more faithfully (the examples on FIG. 4, FIGS. 26-29, FIG. 31), than on images (FIG. 3, FIG. 11, FIG. 12) generated in known devices for traditional or adaptive screening.

What is claimed is:

1. A method for screening the continuous-tone original to form its halftone copy by transformation of an input two-dimensional signal ($E_{i,k}$) of tone of an original, this signal comprising the multilevel tone values of an original areas and presented in the matrix ($[E_{i,k}]_{m,n}$) of m×n areas, into a two-dimensional signal ($E_{hftn\ i,k}$) of a halftone copy, the input two-dimensional signal comprising the bi-level tone values of printing and non-printing elements and presented in the matrix ($[E_{hftn\ i,k}]_{m,n}$) of m×n elements, the method performed by a halftone processor included in a reproducing device, the halftone processor includes a halftone copy signal former, a first weight values distributor, a second weight values distributor, a contour trace signal generator, and a segments signal forming unit, comprising:

forming, by the halftone copy signal former, the two-dimensional signals ($E_{wght\ 1}$, $E_{wght\ 2}$) of weight values distributions, these values belonging to the variety of said tone values and making up the weight value matrixes ($[E_{wght\ 1\ i,k}]_{m,n}$, $[E_{wght\ 2\ i,k}]_{m,n}$), which dimensionally correspond to matrixes of said areas and elements;

distributing, by the first weight values distributor, the values ($E_{wght\ 1}$) within the elements of the first of said weight matrixes without taking into account the tone variation over an original character and distributing, by the second weight values distributor, the values ($E_{wght\ 2}$) within the second of said weight matrixes in dependence with contour or fine detail geometry on an original;

forming, by the halftone copy signal former, the two-dimensional signal ($E_{hftn\ i,k}$) of a halftone copy, its bi-level values ascertained as result of comparison of the first ($[E_{wght\ 1\ i,k}]_{m,n}$) or of the second ($[E_{wght\ 2\ i,k}]_{m,n}$) weight matrixes with the matrix ($[E_{i,k}]_{m,n}$) of tone values of an original; and forming the halftone copy on a substrate dark or light by the reproducing device in accordance with the formed two-dimensional signal, wherein, the method further comprising:

placing the part of weight values of said second matrix within the spatial intervals -segments;

ascertaining, by the contour trace signal generator, the location of said segments by means of forming the contour trace signal $E_{trace\ i,k}$ as a matrix $[E_{trace\ i,k}]_{m,n}$ dimensionally corresponding to weight matrixes and comprising the informative, indicating the contour position, signal values for this matrix elements, corresponding to original areas containing a contour, and comprising the non-informative signal values for the rest elements of contour trace signal matrix; and ascertaining, by the segments signal forming unit, the position of boundaries of said segments dependant on the number of adjacent elements used for the contour or fine detail reproduction on a halftone copy of an original.

2. The method as defined in claim 1, wherein, the two-dimensional signal ($E_{hftn\ i,k}$) of a halftone copy is formed, by the halftone copy signal former, with the use of the reduced volume of two-dimensional tone signal of an original with subjecting this signal to the low spatial frequency filtration.

3. The method as defined in claim 1, wherein the location of segments bounds is defined by the number of the second weight value matrix elements, which are placed between the elements, corresponding to elements of contour trace signal matrix having the informative values, and these bounds, said number being the constant, i.e. not varying over the given image.

4. The method as defined in claim 1, wherein the location of segments bounds is defined by the number of the second weight value matrix elements placed between the elements, which correspond to elements of contour trace signal matrix having the informative values, and these bounds, said number being the variable, which functionally depends on contour parameters, for example, on its sharpness.

5. The method as defined in claim 1, wherein the values of the second weight matrix ($[E_{wght\ 2\ i,k}]_{m,n}$) are distributed randomly in direction from its elements, corresponding to informative values of contour trace signal, to boundaries of a segment.

6. The method as defined in claim 1, wherein the values of the second weight matrix are distributed monotonously decreasing (increasing) in direction from its elements, corresponding to informative values of contour trace signal, to boundaries of a segment.

7. The method as defined in claim 1, wherein the values of the second weight matrix are distributed by simple repetition in direction from its elements, corresponding to informative values of contour trace signal, to boundaries of a segment.

8. The method as defined in claim 1, wherein the values of the second weight matrix are distributed randomly in direction of position of its elements, corresponding to informative values of contour trace signal.

9. The method as defined in claim 1, wherein the values of the second weight matrix are distributed a-periodically in direction of position of its elements, corresponding to informative values of contour trace signal.

10. The method as defined in claim 1, wherein the values of the second weight matrix are distributed in direction of position of its elements, corresponding to informative values of contour trace signal, with the varying periodicity dependant on the strength of a contour.

11. The method as defined in claim 1, wherein, with the contour trace signal has been formed, the original image signal is presented by the matrix of multilevel tone values of an image areas in conjunction with said contour trace signal.

12. The method as defined in claim 11, wherein the number of matrix elements, comprising the multilevel tone values of an image areas, is reduced in relation to that of the input tone signal matrix.

13. An image file format designed, as defined in claim 1, for intermediate storage, transmitting and processing the image in pre-press workflow.

14. A device for adaptive screening, comprising:

a source of two-dimension spatially sampled tone signal of an original;

a two-level halftone copy signal former connected by its tone signal input (E) to said source output;

a contour strength detector connected by its input to said source output;

a second weight values distributor of the second weight values connected by its output to the second weight values input ($E_{wght\,2}$) of the former and communicated by its output with the output of said detector;

a first weight values distributor of the first weight values connected by its output to the first weight values input ($E_{wght\,1}$) of the former;

a contour trace two-dimensional signal generator connected by its input to said detector output; and a segments signal forming unit connected by its input to said generator output and connected by its output to the second weight values distributor and to the segments signal input (Esgm) of the former.

15. A device as defined in claim 14, wherein the two-level halftone copy signal former contains, a modulator with its first and second inputs formed by the first weight values input and by the segments signal input of the former, an adder with one its two inputs connected to the output of said modulator and with its other input formed by the second weight values input of the former, a comparator with one its two inputs connected to the output of said adder and with its other input formed by the tone signal input (E) of the former, and a signal normalizer with its input connected to the output of said comparator and with its output comprising the output of the former.

16. A device as defined in claim 14, wherein the contour trace two-dimensional signal generator contains, a buffer, whose input is connected to the output of contour strength detector, an arithmetical mean determiner, whose input is connected to the output of said detector, a comparator with its first input connected to the output of said determiner and with its other input connected to the output of said buffer, a signal normalizer with its input connected to the output of said comparator, and an output buffer, whose input is connected to the output of said normalizer and whose output comprises the output of contour trace signal generator.

* * * * *